United States Patent
Se et al.

(10) Patent No.: US 7,860,650 B2
(45) Date of Patent: Dec. 28, 2010

(54) NAVIGATION DEVICE WITH POWER SAVING MECHANISM AND METHOD THEREOF

(75) Inventors: Ming-Chung Se, Taipei County (TW); I-Liang Chen, Taipei County (TW)

(73) Assignee: Kinpo Electronics, Inc., Taipei County (TW)

( * ) Notice: Subject to any disclaimer, the term of this patent is extended or adjusted under 35 U.S.C. 154(b) by 516 days.

(21) Appl. No.: 12/059,016

(22) Filed: Mar. 31, 2008

(65) Prior Publication Data

US 2009/0093957 A1 Apr. 9, 2009

(30) Foreign Application Priority Data

Oct. 3, 2007 (TW) .............................. 96137074 A

(51) Int. Cl.
*G01C 21/00* (2006.01)
(52) U.S. Cl. .................. 701/213; 701/33; 701/201; 701/215; 342/357.44; 342/357.74
(58) Field of Classification Search .................. 701/33, 701/36, 201, 213, 215; 342/357.44, 357.64, 342/357.74
See application file for complete search history.

(56) References Cited

U.S. PATENT DOCUMENTS 6,285,315 B1* 9/2001 Pratt ...................... 342/357.42
7,266,615 B2* 9/2007 Yoneya et al. ............... 709/237

* cited by examiner

*Primary Examiner*—Gertrude Arthur Jeanglaud
(74) *Attorney, Agent, or Firm*—J.C. Patents

(57) ABSTRACT

A navigation device with power saving mechanism and method thereof are provided. The navigation device includes a global positioning system (GPS) receiver, a first processing unit, a second processing unit and a sound playing unit. The GPS receiver produces a longitude-latitude information by receiving a satellite signal from the GPS. The first processing unit switches from a first mode to a second mode according to a control signal. Then, the first processing unit is disabled after switching. When the second processing unit is enabled, a direction information and a distance information are generated by comparing the longitude-latitude information with a destination information. The sound playing unit selects two frequencies among a plurality of navigation frequencies according to the direction information and the distance information, and plays the tone signals which are comprised of the two frequencies in sequence.

14 Claims, 4 Drawing Sheets

NAVIGATION DEVICE WITH POWER SAVING MECHANISM AND METHOD THEREOF

CROSS-REFERENCE TO RELATED APPLICATION

This application claims the priority benefit of Taiwan application serial no. 96137074, filed on Oct. 3, 2007. The entirety the above-mentioned patent application is hereby incorporated by reference herein and made a part of specification.

BACKGROUND OF THE INVENTION

1. Field of the Invention

The present invention relates to a navigation device and navigating method thereof, more specifically, the present invention relates to a navigation device with power saving mechanism and navigating method thereof.

2. Description of Related Art

GPS (Global Positioning System) Automatic Vehicle Guidance System (AVGS) uses GPS technology to mount receiving antenna on vehicle, and to display navigation information on the in-vehicle screen with the help of in-vehicle GPS database to guide the driver. In addition, driver can also select driving route, so as to reach destination faster.

However, the manufacturing costs of vehicle including the above GPS is significantly increased, also consumer's financial burden for purchasing vehicle is accordingly increased. In view of such shortcomings, currently, portable GPS navigation device with small size and inexpensive price has been developed.

When motorists uses GPS navigation equipment, since GPS navigation device needs to continuously search and receive signals emitted by positioning satellite, and also needs to calculate the received signals constantly, and to provide user with positioning information and navigation information obtained through calculations in forms of screen display and voice instructions for reference. Therefore, when GPS's screen remains turned on all the time, and a series of voice messages are played all the time, GPS navigation device may consume power significantly, and battery life may also be shortened. In addition, when a user is in the wild, or even when hiking, once the power of GPS navigation device is depleted, it is impossible to continue to provide navigation functions to user. As a result, users may get lost and waste a lot of time, even may get stranded in the mountains and wait for being rescued.

Therefore, to solve the above power consumption problem, general GPS navigation device turns off screen to save power. That is, to save power, GPS navigation system turns off the constant-on screen, and only uses voice to instruct directions to the user. Although such method can reduce power consumption, the effect is limited. After all, a series of voice instructions also consumes a considerable amount of power. If voice can be replaced by simple sound, the power consumption may be reduced to minimum.

SUMMARY OF THE INVENTION

The present invention is directed to a navigation device with power-saving mechanism which can select working mechanism of navigation device in accordance with user needs, so as to reduce power consumption of the navigation device. In addition, the navigation device will also automatically switch to power-saving mode based on the remaining amount of power to increase the time of use of the navigation device.

The present invention provides a navigation method with power-saving mechanism. The navigation method uses a control signal to control the navigation device, so that the navigation device can work continuously with different navigating methods when power is low. Therefore user can use the navigation device for a long time without worrying about the power draining too fast problem.

The present invention also provides a navigation device with power-saving mechanism, including a GPS receiver, a first processor, a second processor and a sound playing unit. The GPS receiver is used to receive the satellite signal of GPS, so as to obtain longitude-latitude coordinates of the navigation device, and to generate a longitude-latitude information according to the longitude-latitude coordinate . The first processing unit switches from the first mode to the second mode based on a control signal. And in the process of switching, a destination information and an enabling signal are output, and when the first processing unit switches to the second mode, it is under disabled mode.

The second processing unit is enabled according to the enabling signal. And when the second processing unit is in enabled state, the second processing unit compares the longitude-latitude information with the destination information, and generates a direction information and a distance information based on the comparison results. The sound playing unit selects two frequencies from a plurality of navigation frequencies as a first frequency and a second frequency according to the direction information and the distance information, and plays a tone signal comprised of the first frequency and the tone signal comprised of the second frequency in sequence.

In an embodiment of the present invention, the above navigation device with power-saving mechanism further includes a longitude-latitude information register, a map information register, an input unit and a display unit. The longitude-latitude information register is used to store longitude-latitude information. The map information register is used to provide a plurality of map information. The input unit has buttons which are used to generate destination information and control signal according to the button operations. The display unit is used to display a positioning information and a navigation information, wherein when the first processing unit is in the first mode, the first processing unit compares the destination information, the longitude-latitude information with a plurality of map information, so as to generate the positioning information and the navigation information; and when the first processing unit switches to the second mode, and map information register, the input and the display unit are all in disabled state.

In addition, the present invention proposes a navigation method with power-saving mechanism. In the navigation method, first, the GPS satellite signals are received to obtain a longitude-latitude coordinate of a navigation device to generate a longitude-latitude information. Next, the first mode is switched to the second mode according to a control signal, and a destination information and a enabling signal are output in the process of switching step. The longitude-latitude information is compared with the destination information according to the enabling signal, and a direction information and a distance information are generated according to the comparison result. Next, two frequencies from a plurality of navigation frequencies are selected as a first frequency and a second frequency according to the direction information and the distance information. Next, the tone signal comprised of the first frequency and the tone signal comprised of the second frequency in sequence is played.

In an embodiment of the present invention, the above navigation method with power-saving mechanism further includes the steps of (a) storing the longitude-latitude information; (b) providing the destination information and a plurality of map information; (c) comparing the destination information, the longitude-latitude information with a plurality of map information to generate a positioning information and a navigation information; (d) displaying the position information and the navigation information; (e) stopping execution of the operations of Step b to Step d when switching to the second mode.

The present invention proposes a power-saving mechanism for a navigation device, so that navigation device navigates with screen and voice in the regular mode. While in the power-saving mode, tone signals of different frequencies are used to instruct the user, therefore the navigation device can effectively save electricity, so as to allow a longer time use without worrying about power loosing of power too fast.

In order to the make the aforementioned and other objects, features and advantages of the present invention comprehensible, a preferred embodiment accompanied with figures is described in detail below.

BRIEF DESCRIPTIONS OF DRAWINGS

DESCRIPTION OF EMBODIMENTS

Figure 1:
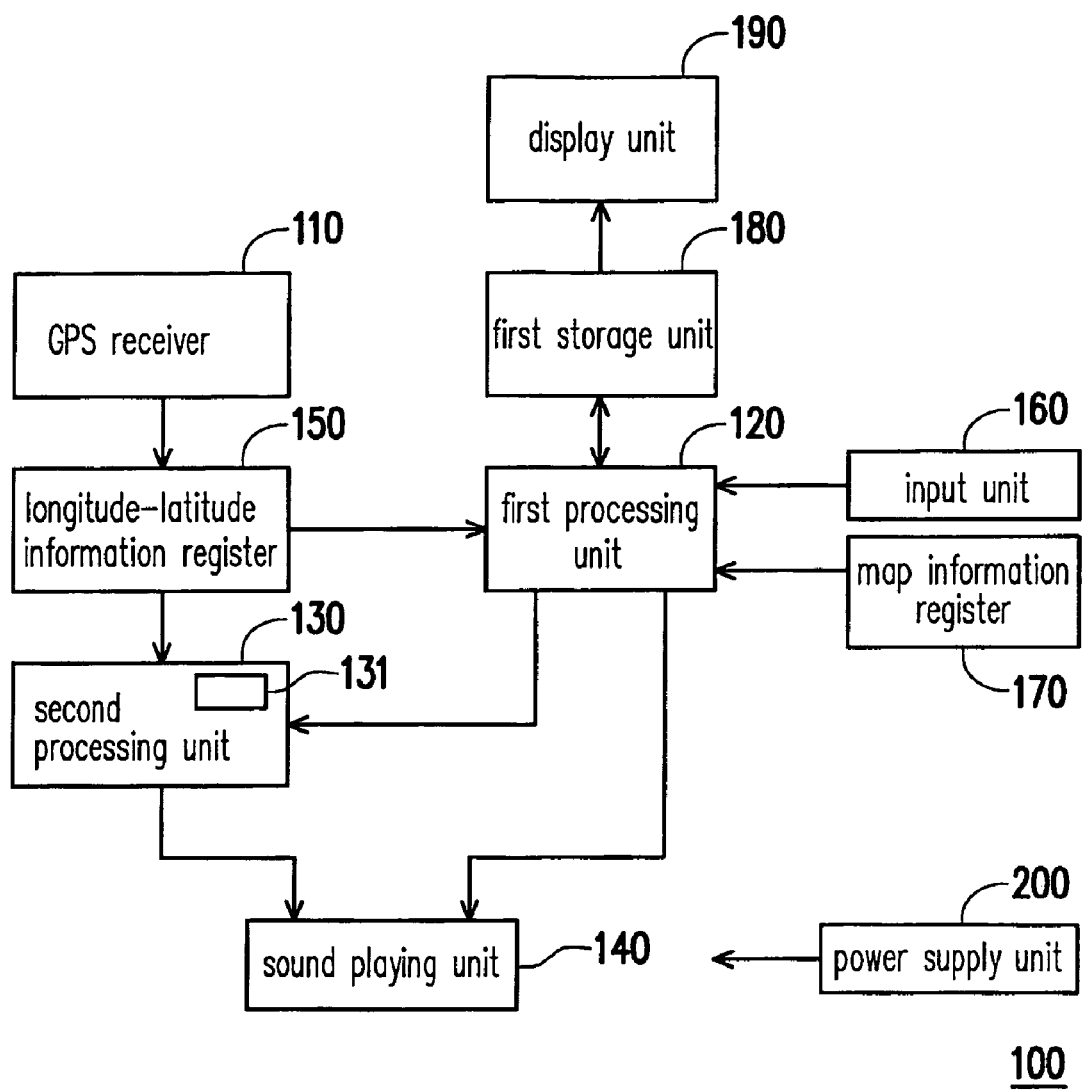
FIG. 1 is a schematic structure of a navigation device with power-saving mechanism according to an embodiment of the present invention.

FIG. 1 is a schematic structure of a navigation device with power-saving mechanism according to an embodiment of the present invention. In FIG. 1, the navigation device 100 with power-saving mechanism includes a GPS receiver 110, a first processing unit 120, a second processing unit 130 and a sound playing unit 140. Wherein the GPS receiver 110 is coupled to the first processing unit 120 and the second processing unit 130, and the second processing unit 130 is coupled to the sound playing unit 140.

The present invention provides a navigation device 100 with power-saving mechanism is a navigation device with switching mechanism. The navigation device 100 performs switching action using the first processing unit 120. In other words, when the first processing unit 120 is in the first mode, the navigation device 100 will enter into a regular mode. Correspondingly, when the first processing unit 120 is in the second mode, the navigation device 100 will enter into a power-saving mode. The above two mechanisms will be described in detail below.

With reference to FIG. 1, the GPS receiver 110 is used to receive the satellite signal of GPS, so as to obtain the longitude-latitude coordinate of the navigation device 100, and to generate a longitude-latitude information according to the longitude-latitude coordinate. Moreover, since the pre-set mode of the first processing unit 120 is the first mode, when the navigation device 100 is activated, the first processing unit 120 will be in an enabled state, so that the navigation device 100 is maintained under the regular mode. When the navigation device 100 is switched to power-saving mode, the first processing unit 120 will switch from the first mode to the second mode based on a control signal. And in the process of switching, a destination information and an enabling signal are output. And at this time, the first processing unit 120 will be under disabled mode, so that the navigation device 100 switches to power-saving mode.

When the navigation device 100 is under power-saving mode, the second processing unit 130 originally in disabled state will be enabled according to the enabling signal. Thus, the second processing unit 130 compares the destination information with the longitude-latitude information, and generates a direction information and a distance information based on the comparison result. After the direction information and the distance information are obtained, the sound playing unit 140 may select two frequencies among a plurality of navigation frequencies as the first frequency and the second frequency according to the two signals, and play a tone signal comprised of the first frequency and a tone signal comprised of the second frequency in sequence, wherein the tone signal is similar to the beeps produced by a buzzer.

Further, in above embodiment, the second processing unit 130 first compares the destination information with the longitude-latitude information to calculate an angle difference between the current location and the destination, and the angle difference is the direction information. Next, based on the angle difference, a corresponding frequency is selected from a plurality of pre-set navigation frequencies as the first frequency. Next, the second processing unit 130 continues to compare the destination information with the longitude-latitude information, and calculates a distance difference between the current location and the destination. The distance difference is the distance information. Next, based on the distance difference, a corresponding frequency is selected from a plurality of pre-set navigation frequencies as the second frequency.

Lastly, the sound playing unit 140 plays the tone signal comprised of the first frequency and plays the tone signal comprised of the second frequency in sequence. In this way, by repeating the above steps, the direction and distance can be determined. In addition, the above a plurality of pre-set navigation frequencies can be arranged in descending or ascending order, for example, arranged in 1 kHz, 5 kHz, 10 kHz or 10 kHz, 5 kHz, 1 kHz order, etc. Thus, users can determine whether or not the current location is getting closer to the destination based on the ascending frequency or the descending frequency.

Figure 2A:
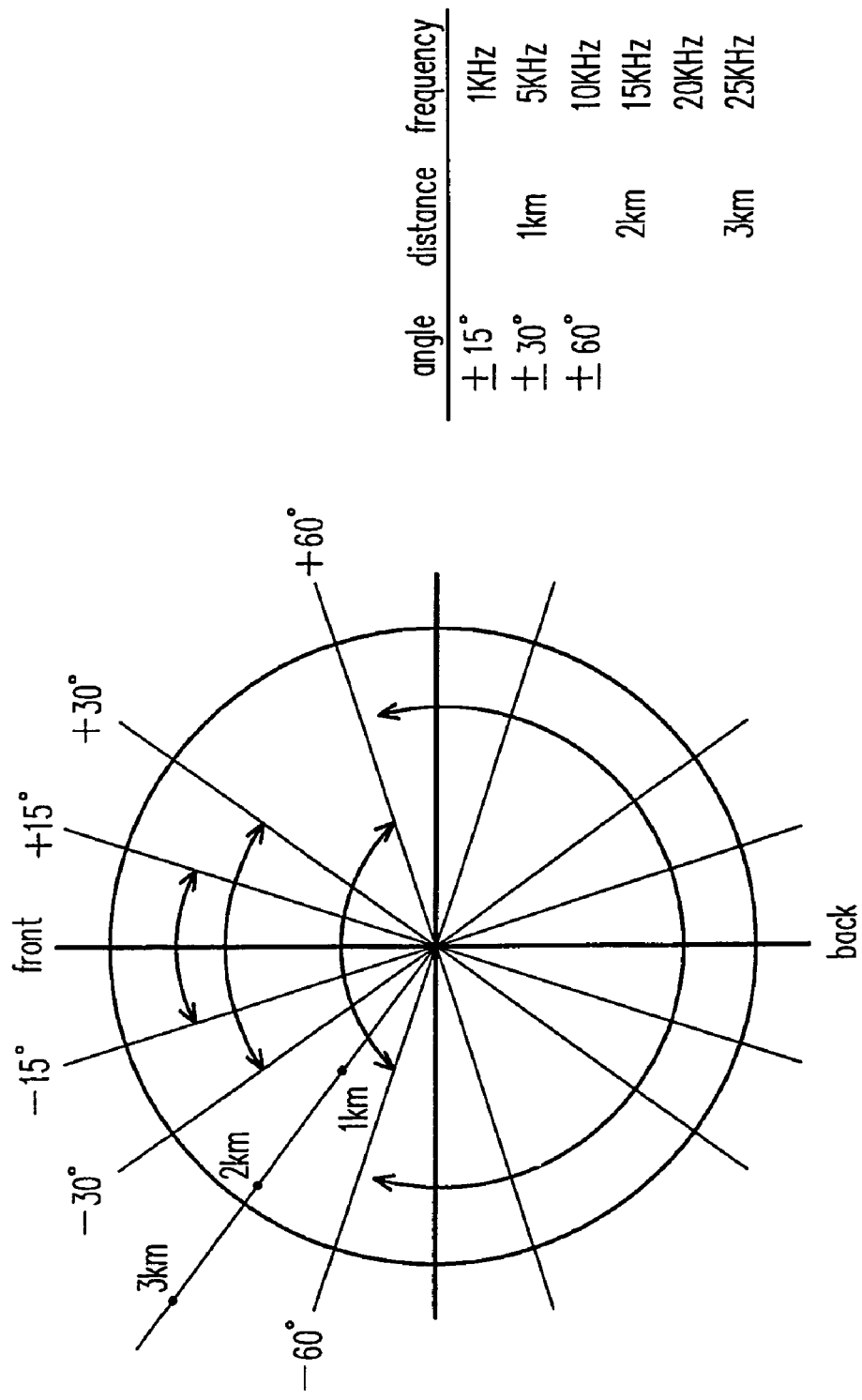
FIG. 2A is an angle-distance chart of the navigation device with power-saving mechanism illustrating the power-saving mode according to an embodiment of the present invention.

FIG. 2A is an angle-distance chart of the navigation device with power-saving mechanism illustrating power-saving mode according to an embodiment of the present invention. It is seen from FIG. 2A, after the second processing unit 130 calculates the angle difference between current location and destination, a sound to be played can be located according to a differential value. For example, a tone signal comprised of 1 kHz is played when the angle difference is between +15 degree and −15 degree; a tone signal comprised of 15 kHz is played when the distance is two kilometers; and a warning sound can be played when the angle is beyond +60 and −60 degrees range.

Figure 2B:
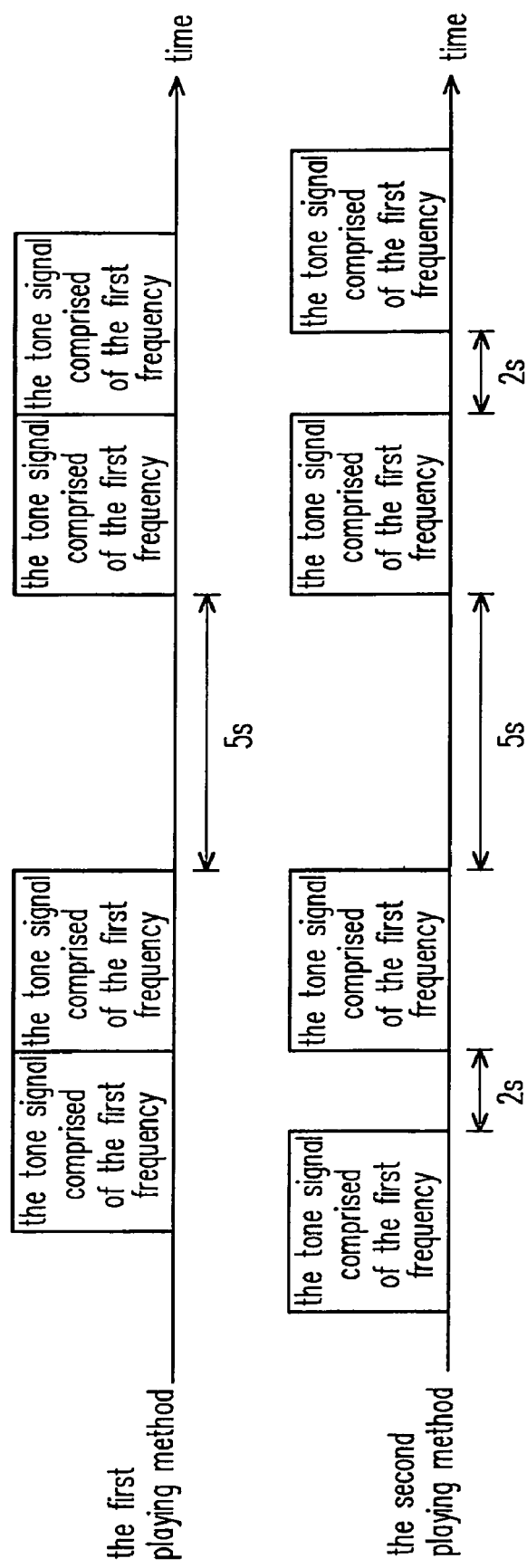
FIG. 2B is a diagram showing two sound playing methods of the navigation device with power-saving mechanism according to an embodiment of the present invention.

It is worth mentioning that under the power-saving mode, the navigation device 100 can also achieve power-saving effect by adjusting the playing method of the sound playing unit 140. FIG. 2B is a diagram of two sound playing methods of the navigation device with power-saving mechanism according to an embodiment of the present invention. In FIG. 2B, the first playing method plays the tone signal comprised of the second frequency right after the tone signal comprising the first frequency is played; and after a five seconds interval, the next tone signal is played. The second playing method plays the tone signal comprised of the second frequency after a two seconds interval after the tone signal comprised of the first frequency is played; and after a five seconds interval, the next tone signal is played. Therefore as it is seen from FIG. 2B, the second playing method is more power-saving than the first playing method. That is to say, the longer the time interval when playing sounds, the more power can be saved.

Therefore, it is seen from the descriptions of the present embodiment, when the navigation device 100 enters power-saving mode, a beep sound is used to guide user instead of using the screen and a series of complex voices. Therefore power consumption can be effectively reduced. In addition, more power can be saved if the playing method of the navigation device 100 is further adjusted.

It is noteworthy that in the present embodiment, the second processing unit 130 includes the second storage unit 131. The second storage unit 131 is used to store the destination information output by the first processing unit 120, and to provide to the second processing unit 130 for calculation. In addition, the navigation device 100 includes a longitude-latitude information register 150. The longitude-latitude information register 150 is coupled between the GPS receiver 110 and the second processing unit 130, and is used to store the longitude-latitude information output by the GPS receiver 110, and to provide to the processing units for calculation.

Having described the operations of the navigation device 100 under power-saving mode, the operations under general mode will be described next. In FIG. 1, the navigation device 100 with power-saving mechanism further includes the input unit 160, the map information register 170, the first storage unit 180 and the display unit 190. Wherein the input unit 160 and the map information register 170 are coupled to the first processing unit 120, and the first storage unit 180 is coupled to the first processing unit 120 and the display unit 190.

Still referring to FIG. 1, since the pre-set working mode of the first processing unit 120 is the first mode, when the navigation device 100 is activated, the first processing unit 120 will be in enabled state, and the navigation device 100 is maintained under regular mode. When the navigation device 100 is under regular mode, the respective elements in the navigation device 100 are all in enabled state, and only the second processing unit 130 is in disabled state. Therefore, the map information register 170 may provide a plurality of map information under enabled state for the first processing unit 120 to perform calculation. The input unit 160 has a plurality of buttons. In the enabled state, the input unit 160 generates a destination information according to button operation.

Therefore, after the first processing unit 120 receives the destination information and stores the same in the first storage unit 180, the first processing unit 120 compares the destination information, the longitude-latitude information and a plurality of map information, so as to generate a position information and a navigation information, and to store the same in the first storage unit 180. After the positioning information and navigation information are obtained, the display unit 190 displays the two pieces of information, and the sound playing unit 140 plays the voice signals corresponding to the navigation information.

It is worth mentioning that when the first processing unit 120 is switched to the second mode, the first processing unit 120 will be in disabled state, besides, the input unit 160, the map information register 170, the first storage unit 180 and the display unit 190 will also be in disabled state.

Still with reference to FIG. 1, the navigation device 100 with power-saving mechanism further includes a power supply unit 200, wherein the power supply unit 200 is employed to provide working power for the navigation device 100. When the power level of the power supply unit 200 drops to a specific level (for example one-tenth of the total power level), a control signal will be output to the first processing unit 120 to direct the first processing unit 120 to switch to the second mode, so that the navigation device 100 can enter the power-saving mode to save power. In addition, when the navigation device 100 is in regular mode, the control signal may also be generated through operation of the buttons of the input unit 160 to allow the first processing unit 120 to switch to the second mode, so that the navigation device 100 enters the power-saving mode.

Figure 3:
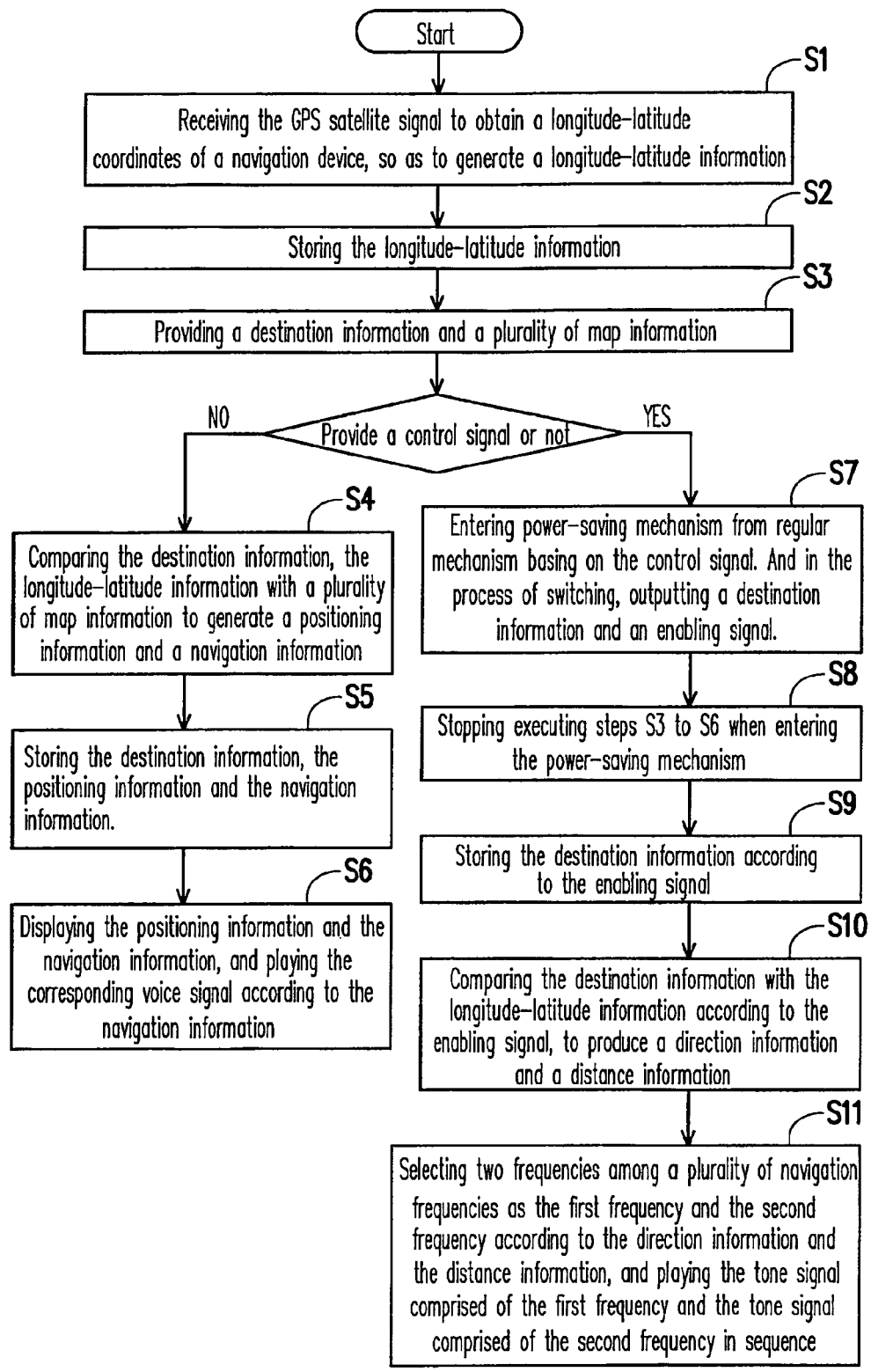
FIG. 3 is a flow chart of a navigating method with power-saving mechanism according to an embodiment of the present invention.

FIG. 3 is a flow chart of a navigation method with power-saving mechanism according to another embodiment of the present invention. Referring to FIG. 3, first, having been activated, the navigation device with power-saving mechanism may first receive the GPS satellite signal to obtain a longitude-latitude coordinate of a navigation device, so as to generate a longitude-latitude information (Step S1), and to store the longitude-latitude information (Step S2). Next, a destination information and a plurality of map information are provided (Step S3). After this, whether or not to provide a control signal selected, so as to determine if the navigation device is under the regular mode or the power-saving mode.

Therefore, when selecting to not to provide the control signal, the navigation device is switched to the regular mode. At this time, the destination information, the longitude-latitude information will be compared with a plurality of map information to generate a positioning information and a navigation information (Step S4). Next, the navigation devices stores the destination information, the positioning information and the navigation information (Step S5), and displays the positioning information and the navigation information on the screen, and plays the corresponding voice signals according to the navigation information (Step S6).

Based on the above description, when providing a control signal, the navigation device will enter the power-saving mode from the regular mode based on the control signal. And in this process, a destination information and an enabling signal are output (Step S7). In addition, when entering the power-saving mode, meanwhile the navigation device may stop executing steps S3 to S6 (Step S8). Therefore, the navigation device will store the destination information according to the enabling signal (Step S9), and compare the destination information with the longitude-latitude information to produce a direction information and a distance information (Step S10). Next, two frequencies are selected among a plurality of navigation frequencies as the first frequency and the second frequency according to the direction information and the distance information, and the tone signal comprised of the first frequency and the tone signal comprised of the second frequency are played in sequence (Step S11).

It is worth noticing that when the power level of the navigation device drops to a specific level (for example one-tenth of the total power level), a control signal will also be provided, so that the navigation device enters into the power-saving mode to save power. Since other details of the present embodiment have been included in the above embodiments, they will not be repeated herein.

In summary, the present invention proposes a power-saving mechanism for a navigation device, so that the navigation device can be switched between two different modes. When entering into the power-saving mode, the navigation device directs the user with tone signals of different frequencies. And level changes of frequencies are used to allow user to distinguish the direction and distance between the current position and the destination. Therefore navigation effect can be achieved without a series of voice instructions and keeping the screen on for long time so that the power can be effectively saved. Moreover, under the regular mode, the navigation device functions similar to other navigation devices on the market to navigate with screen display and voice instruction. Therefore the practicality of the operation method of the navigation device can be greatly increased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A navigation device with power-saving mechanism, comprising:
   a GPS receiver, for receiving a satellite signal of GPS to obtain a longitude-latitude information;
   a first processing unit, for switching from a first mode to a second mode according to a control signal, and outputting a destination information and an enabling signal during the process of switching from the first mode to the second mode, wherein the first processing unit is in disabled mode when the first processing unit switches from the first mode to the second mode;
   a second processing unit, being enabled according to the enabling signal for comparing the longitude-latitude information with the destination information, and generating a direction information and a distance information according to the comparison result; and
   a sound playing unit, for selecting two navigation frequencies among a plurality of navigation frequencies as a first frequency and a second frequency according to the direction information and the distance information, and playing a tone signal comprised of the first frequency and a tone signal comprised of the second frequency in sequence.

2. The navigation device with power-saving mechanism of claim 1, further comprising:
   a longitude-latitude information register, for storing the longitude-latitude information;
   a map information register, for providing a plurality of map information;
   an input unit, comprising at least a button for generating the destination information and the control signal according to the button operation; and
   a display unit, for displaying a positioning information and a navigation information,
   wherein when the first processing unit is in the first mode, the first processing unit compares the destination information, the longitude-latitude information with a plurality of the map information to generate the positioning information and the navigation information, and when the first processing unit is switched to the second mode, the map information register, the input unit and the display unit are all in disabled state.

3. The navigation device with power-saving mechanism of claim 2, further comprising:
   a first storage unit, for storing the destination information, the positioning information and the navigation information, wherein when the first processing unit is switched to the second mode, the first storage unit is in disabled state.

4. The navigation device with power-saving mechanism of claim 2, wherein the sound playing unit further plays the corresponding voice signal according to the navigation information.

5. The navigation device with power-saving mechanism of claim 1, further comprising a power supply unit for providing power to the navigation device, wherein when a power level of the power supply unit drops to a predetermined level, the power supply unit generates the control signal.

6. The navigation device with power-saving mechanism of claim 1, wherein the second processing unit comprises a second storage unit for storing destination information.

7. The navigation device with power-saving mechanism of claim 1, wherein the navigation frequencies are a plurality of frequencies arranged in ascending or descending order.

8. The navigation device with power-saving mechanism of claim 1, wherein the first mode is a pre-set working mode of the first processing unit.

9. A navigating method with power-saving mechanism, comprising:
   receiving a satellite signal of GPS to generate a longitude-latitude information for indicating a position of a navigation device;
   switching from a first mode to a second mode according to a control signal, and outputting a destination information and an enabling signal during the process of switching from the first mode to the second mode;
   comparing the longitude-latitude information with the destination information according to the enabling signal, and generating a direction information and a distance information according to the comparison result; and
   selecting two frequencies among a plurality of navigation frequencies as a first frequency and a second frequency according to the direction information and the distance information, and playing a tone signal comprised of the first frequency and a tone signal comprised of the second frequency in sequence.

10. The navigating method with power-saving mechanism of claim 9, further comprising:
    (a) storing the longitude-latitude information;
    (b) providing the destination information and a plurality of map information;
    (c) comparing the destination information, the longitude-latitude information with a plurality of map information to generate a positioning information and a navigation information;
    (d) displaying the positioning information and the navigation information; and
    (e) stopping the execution of step (b) to step (d) when switching from the first mode to the second mode.

11. The navigating method with power-saving mechanism of claim 10, further comprising:
    (f) storing the destination information, the positioning information and the navigation information;
    (g) playing the corresponding voice signal according to the navigation information; and
    (h) stopping execution of step (f) and step (g) when switching from the first mode to the second mode.

12. The navigating method with power-saving mechanism of claim 9, further comprising a step of storing the destination information according to the enabling signal.

13. The navigating method with power-saving mechanism of claim 9, further comprising a step of providing the control signal indirectly or directly when a power level of the navigation device dropped to a predetermined level.

14. The navigating method with power-saving mechanism of claim 9, wherein the navigation frequencies are a plurality of frequencies arranged in ascending or descending order.

* * * * *